Patented Mar. 14, 1944

2,344,061

UNITED STATES PATENT OFFICE 2,344,061

PREPARATION OF 1-CHLORO-1-FLUORO ETHYLENE

Mary W. Renoll, Dayton, Ohio, assignor to Monsanto Chemical Company, St. Louis, Mo., a corporation of Delaware No Drawing. Application July 19, 1940, Serial No. 346,345

3 Claims. (Cl. 260—653)

This invention relates to an improved method for the preparation of 1-chloro-1-fluoro-ethylene. 1-chloro-1-fluoro-ethylene has the formula,

and is a colorless gas at room temperature and atmospheric pressure. Its point of liquefaction is −25.5° C. at a pressure of 741 mm. of mercury and its freezing point is below −80° C. The polymerization and co-polymerization of this unsaturated polymerizable organic compound has been described in co-pending application, Serial Number 346,346, filed July 19, 1940.

According to my work, 1-chloro-1-fluoro-ethylene can be prepared, in general, by the removal of the substituents represented by X from compounds possessing the general formula, $CH_2X-CXClF$, wherein one X is a halogen other than fluorine and the other X is a member of the group consisting of hydrogen, and a halogen other than fluorine. Illustrative of the materials possessing the above described general formula, $CH_2X-CXClF$, that can be employed are 1-bromo-2,2-dichloro-2-fluoro-ethane, 1-chloro-2,2-dichloro-2-fluoro-ethane and 1,2-dichloro-2-fluoro-ethane. According to the present invention, 1-chloro-1-fluoro-ethylene may be prepared in high yields from 1-bromo-2,2-dichloro-2-fluoro-ethane.

In the preparation of 1-chloro-1-fluoro-ethylene from compounds possessing the general formula, $CH_2X-CXClF$, it has been found that the removal of the substituents represented by X can be accomplished by methods similar to processes previously described in the chemical literature. Thus, where both X's represent halogens other than fluorine, a selective dehalogenation treatment is employed, i. e., a process whereby a halogen other than fluorine is removed from each carbon atom, as for example, reaction with zinc in the presence of anhydrous ethanol. On the other hand, where one X represents a halogen other than fluorine and the other X represents hydrogen, a selective dehydrohalogenation treatment is necessary. Thus, it has been found that this reaction can be carried out, for example, by treatment with alcoholic potassium hydroxide under suitable conditions.

The following is a specific example illustrative of the process of the present invention whereby the compound, 1-chloro-1-fluoro-ethylene, can be prepared, the parts being by weight. First, 1,2-dibromo-2,2-dichloro-ethane was prepared from 1,1-dichloro-ethylene according to a process set forth by van de Walle in the Bulletin de l'academie royale de medecine de Belgique, pages 94–104 (1924). The 1,2-dibromo-2,2-dichloro-ethane, so prepared, was then treated with hydrogen fluoride in the presence of red mercuric oxide, by a process similar to that described by Henne in the Journal of the American Chemical Society, vol. 60, pages 1569–1571 (1938). In carrying out this reaction, 217 parts (one molecular proportion) of mercuric oxide were added, preferably in successive small portions, to substantially 770 parts (three molecular proportions) of 1,2-dibromo-2,2-dichloro-ethane contained in a suitable reaction vessel and provided with means for agitation. Following the addition of each portion of mercuric oxide, anhydrous hydrogen fluoride was introduced into the reaction mixture until the appearance of white mercuric bromide was noted. During this period, the reaction mixture was cooled by a suitable method, as for example, by surrounding the reaction vessel with ice. After all of the materials had been added to the reaction vessel, the mixture was allowed to stand over night at room temperature, and then was poured into ice water and the water insoluble product washed by decantation. Final purification of the product was accomplished by suitable means, as for example, by steam distillation followed by fractionation under reduced pressure.

The purified product, a colorless liquid, was found to be 1-bromo-2,2-dichloro-2-fluoro-ethane and was obtained in a yield of substantially 50%, based on the amount of red mercuric oxide employed. This hitherto unknown chemical compound was found to possess the following physical properties:

Boiling point—110.8° C. at 760 mm. of mercury
Freezing point—Solidifies to a transparent solid at liquid air temperatures
Density—$d_4^{25}$ 1.8672
Refractive index—$n_d^{25}$ 1.4626

The 1-bromo-2,2-dichloro-2-fluoro-ethane, so prepared, was then subjected to the action of mossy zinc in the presence of anhydrous ethanol and, preferably, in the presence, additionally, of a small amount of cuprous chloride. In carrying out this reaction, 366 parts of 1-bromo-2,2-dichloro-2-fluoro-ethane, dissolved in an equal volume of anhydrous ethanol, were added at a suitable rate to a mixture comprising substantially 130 parts of mossy zinc, a small amount of cuprous chloride and 60 parts of anhydrous ethanol contained in a suitable reaction vessel. It was found preferable to warm the reaction vessel and to introduce a small amount of undiluted 1-bromo-2,2-dichloro-2-fluoro-ethane to initiate the reaction prior to the addition of the alcohol solution of 1-bromo-2,2-dichloro-2-fluoro-ethane. The product of this reaction was distilled out of the reaction vessel as formed, condensed and collected in a receiving vessel cooled to a very low temperature, for example, to −80° C.

The product after purification, for example, by re-distillation, was found to be 1-chloro-1-fluoro-ethylene and was obtained in a yield of substantially 77%.

This invention is limited solely by the claims attached hereto.

What is claimed:

1. A process for preparing 1-chloro-1-fluoro-ethylene comprising removing the bromine atom and one chlorine atom from 1-bromo-2,2-dichloro-2-fluoro-ethane by subjecting said compound to the action of zinc in the presence of anhydrous ethanol.

2. Process as defined in claim 1 in which said bromine and chlorine atoms are removed by subjecting said compound to the action of zinc in the presence of anhydrous ethanol and a small amount of cuprous chloride.

3. Process as defined in claim 1 in which said 1-bromo-2,2-dichloro-2-fluoro-ethane is dissolved in anhydrous ethanol and the solution is added to a mixture comprising zinc and a small amount of cuprous chloride in anhydrous ethanol and in which the product of the resulting reaction is distilled out as formed, condensed, and collected.

MARY W. RENOLL.